United States Patent
Knoblich et al.

(10) Patent No.: US 9,063,342 B2
(45) Date of Patent: Jun. 23, 2015

(54) MICROSCOPE COMPRISING MULTIPLE OPTICAL SYSTEMS IN THE IMAGING BEAM PATH

(75) Inventors: Johannes Knoblich, Jena (DE); Johannes Winterot, Jena (DE); Tobias Kaufhold, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 17 days.

(21) Appl. No.: 13/256,163

(22) PCT Filed: Mar. 6, 2010

(86) PCT No.: PCT/EP2010/001414
§ 371 (c)(1),
(2), (4) Date: Sep. 12, 2011

(87) PCT Pub. No.: WO2010/102766
PCT Pub. Date: Sep. 16, 2010

(65) Prior Publication Data
US 2012/0002274 A1    Jan. 5, 2012

(30) Foreign Application Priority Data
Mar. 11, 2009   (DE) .................... 10 2009 012 707

(51) Int. Cl.
*G02B 21/00*  (2006.01)
*G02B 21/36*  (2006.01)
*G02B 21/24*  (2006.01)
(Continued)

(52) U.S. Cl.
CPC ............ *G02B 21/365* (2013.01); *G02B 21/025* (2013.01); *G02B 21/22* (2013.01); *G02B 21/24* (2013.01)

(58) Field of Classification Search
CPC ............... G02B 21/00; G02B 21/0016; G02B 21/0088; G02B 21/0096; G02B 21/025; G02B 21/20–21/22; G02B 21/36–21/368
USPC ................................ 359/368–384; 250/201.3
See application file for complete search history.

(56) References Cited

U.S. PATENT DOCUMENTS

| | | | |
|---|---|---|---|
| 5,276,550 A | | 1/1994 | Kojima |
| 5,668,660 A | * | 9/1997 | Hunt ........................... 359/380 |
| 5,703,714 A | | 12/1997 | Kojima |

(Continued)

FOREIGN PATENT DOCUMENTS

| | | |
|---|---|---|
| DE | 198 22 256 C2 | 12/1999 |
| DE | 102 49 177 B4 | 5/2004 |

(Continued)

*Primary Examiner* — Stephone B Allen
*Assistant Examiner* — James McGee
(74) *Attorney, Agent, or Firm* — Patterson Thuente Pedersen, P.A.

(57) ABSTRACT

A microscope comprising multiple optical systems in the imaging beam path and at least one subassembly, the optical effect of which in relation to the imaging beam path can be modified by controlling the subassembly, e.g. a group of lenses or a diaphragm that can be moved in the direction of the optical axis, a diaphragm having a variable aperture, a digital zoom device, a shutter, or a focusing device. The microscope includes a control unit which is designed to generate control signals for the subassembly in a first mode of operation to regulate or control the functional parameters exclusively of the imaging optical system with which the subassembly is associated, and additionally in a second mode of operation to regulate or control the functional parameters of the entire optical system of the microscope.

12 Claims, 10 Drawing Sheets

(51) Int. Cl.
*G02B 21/02* (2006.01)
*G02B 21/22* (2006.01)

(56) References Cited

U.S. PATENT DOCUMENTS

| | | | |
|---|---|---|---|
| 6,590,359 B2 | 7/2003 | Kaufhold et al. | |
| 6,628,098 B2 | 9/2003 | Kaufhold et al. | |
| 6,674,582 B2 | 1/2004 | Kawasaki | |
| 6,891,669 B2 | 5/2005 | Yoneyama et al. | |
| 6,917,377 B2 * | 7/2005 | Aizaki et al. | 348/79 |
| 7,006,675 B2 | 2/2006 | Olschewski | |
| 7,064,911 B2 | 6/2006 | Soppelsa | |
| 7,447,426 B2 * | 11/2008 | Okawara | 396/79 |
| 7,471,458 B2 | 12/2008 | Straehle et al. | |
| 7,542,202 B2 | 6/2009 | Hashimoto et al. | |
| 7,692,857 B2 | 4/2010 | Knoblich et al. | |
| 7,773,297 B2 | 8/2010 | Matsukawa et al. | |
| 7,855,844 B2 | 12/2010 | Okabe | |
| 8,040,599 B2 * | 10/2011 | Steffen et al. | 359/388 |
| 2003/0103662 A1 | 6/2003 | Finkbeiner | |
| 2005/0111086 A1 * | 5/2005 | Knoblich et al. | 359/368 |
| 2005/0179998 A1 | 8/2005 | Studer et al. | |
| 2007/0047094 A1 | 3/2007 | Winterot et al. | |
| 2008/0212171 A1 * | 9/2008 | Strahle et al. | 359/377 |

FOREIGN PATENT DOCUMENTS

| | | |
|---|---|---|
| DE | 10 2004 052 253 A1 | 7/2005 |
| DE | 10 2005 040 830 A2 | 3/2007 |
| DE | 10 2005 050 171 A1 | 4/2007 |
| EP | 0 453 239 A1 | 10/1991 |
| EP | 1 510 846 B1 | 7/2006 |
| EP | 0 996 863 B1 | 8/2006 |
| EP | 1 710 610 A2 | 10/2006 |
| EP | 1 772 764 A2 | 4/2007 |
| EP | 1 975 672 A1 | 10/2008 |
| EP | 1 992 977 A2 | 11/2008 |
| JP | 2007213103 A | 8/2007 |
| WO | WO 99/60436 | 11/1999 |
| WO | WO 01/88592 A2 | 11/2001 |

* cited by examiner range of magnification: 12.5x 0.32-4.0

MICROSCOPE COMPRISING MULTIPLE OPTICAL SYSTEMS IN THE IMAGING BEAM PATH

PRIORITY CLAIM

The present application is a National Phase entry of PCT Application No. PCT/EP2010/001414, filed Mar. 6, 2010, which claims priority from German Application Number 102009012707.0, filed Mar. 11, 2009, the disclosures of which are hereby incorporated by reference herein in their entirety.

FIELD OF THE INVENTION

The invention relates to a microscope with several optical systems in the imaging beam path and at least one subassembly whose optical effect on the imaging beam path can be varied by control, viz., a lens group or diaphragm that can be shifted along the optical axis, a diaphragm of variable aperture, a digital zoom device, a shutter or a focusing device.

The invention permits a specimen positioned in the object plane of the microscope to be imaged into the image plane in multiple stages if all systems involved are tuned to each other. The said tuning is carried out with the aim of achieving the best possible functionality of the overall microscopical system, especially considering the possibilities for minimizing or compensating residual optical aberrations.

BACKGROUND

Microscopes with optical zoom systems in the imaging beam path are known. Among them there are, especially, two-channel stereomicroscopes equipped with zoom systems, or single-channel microscopes of, as a rule, higher resolution. The latter are sometimes also known as "macroscopes", because they provide long working distances and large object fields.

Also known is the use of objectives of variable magnification and variable resolution in multilens microscope systems with or without a tube lens system. Here, object imaging is implemented, for example, by combining the movements of optical components along the optical axis with the variation of the diameter of an iris diaphragm.

In this respect, JP 2007213103 A1 describes an objective with a first fixed and two movable groups and a tube lens arranged behind them. The movement of the two groups along the optical axis is synchronized with the variation of the diameter of a diaphragm arranged behind the fixed group.

The movements of lens components in the zoom systems can be positively controlled by means of cams, e.g., in the form of drum cams, or by means of direct drive units coupled to a lens group each.

Microscopes in which zoom systems are controlled by means of cams are described, e.g., in
  U.S. Pat. No. 6,891,669 B2 entitled "Microscope System",
  DE 102 49 177 B4 entitled "Control unit for a microscope", and
  EP 1 510 846 B1 entitled "Guiding system for optical systems, especially zoom systems".
Zoom systems controlled by direct drive motors are described, e.g., in
  DE 198 22 256 C2 (EP 0 996 863 B1) entitled "Arrangement for the direct control of the motions of a zoom system in a stereomicroscope",
  U.S. Pat. No. 6,590,359 B2 entitled "Method for effecting the synchronous control of several stepping motors",
  U.S. Pat. No. 6,628,098 B2 entitled "Method for accelerating a control movement in a positioner system with step motors".

The movement of the lens components by direct motor drive is effected by use of control commands stored in an electronic data record assigned to the respective lens component. The electronic data record has the function of a virtual control cam. As with a mechanical control cam, controlling the movement of a lens component is effected taking into account the movement control of the other movable lens components of one and the same zoom system.

Furthermore, microscopes are known in which motor drives effect not only the movement of the lens components but also the control of diaphragms, e.g., the aperture diaphragm, and of shutters, such as in connection with fluorescence illumination.

Described, e.g., in EP 1 710 610 A3 entitled "Microscope comprising a control unit for controlling the movement speed of the sample stage according to the observation power of the selected lens unit" is a motorized microscope system in which controlling the speed of stage movement for the purpose of focusing is effected as a function of the current magnification of the optical system. The current magnification is derived from the positions of the lens components within a zoom system.

In the publication U.S. Pat. No. 6,891,669 B2 "Microscope System" mentioned above, an arrangement for the active control of optical components is proposed, which takes into account the light intensity detected by a sensor on the image side.

U.S. Pat. No. 7,006,675 B2 entitled "Method and arrangement for controlling analytical and adjustment operations of a microscope and software program" describes an arrangement for the computer-assisted control of system parameters, preferably in a confocal scanning microscope, for the purpose of achieving reproducible setting and control of the parameters for image documentation and image processing.

In US 2003/0103662 A1 "Robotic Microscopy System", a microscope system with automated parameter settings is described, with which a high throughput of biological samples by fast image analysis is claimed to be achieved.

WO 01/088592 A3 entitled "Microscope Inspection System" describes an automated optical inspection system which is equipped with a zoom autofocus system and a camera. Here again, various functional units of the microscope or external components are coupled via control units.

As an example of prior art, FIG. 1 shows a motorized, modular-design stereomicroscope system, which consists of mechanically coupled and—via interfaces—electronically linked components
  for observation, image recording and image processing,
  for supporting and focusing,
  for illumination and contrasting, and
  for operation and control.

Means for observation, image recording and image processing comprise the binocular viewing tube 1, the motorized zoom system 2 with antiglare shield 3, a controllable multiple nosepiece 7, and the camera 18. A motor focus system with stand column 16 is provided for supporting and focusing. For illumination and contrasting, a transmitted-light illuminator 4 with specimen receptacles 5 and 6 and controllable light source 14, and a reflected-light illuminator with focusing optics 8 and controllable light source 13 are provided. Operation and control are effected by a focus control unit 15, a zoom control unit 17, a transmitted-light operating unit 9, a central control unit 12 for coupling the components to be controlled, a central control element 10 for influencing system control, optional pedal switches 11 for controlling various system functions, and an optional PC 19 with monitor and software for system control and image processing.

Because of the functional coupling of diverse system components, such as e.g., magnification and/or zoom system, focusing system and light source control, a higher functionality of the overall system is achieved, the efficiency of microscopy is enhanced, and setting the system is facilitated for less experienced users.

Known configurations of such microscopes also have means for saving defined system settings in the central control unit or in the PC as user profiles.

As a disadvantage of the known microscopes with functional coupling of diverse system components, including the functional coupling of integrated zoom systems, each motorized or controllable system component is assigned its own, invariable control profile in the form of a mechanical control cam or in the form of an electronic data record as a virtual control cam.

Thus, also the control function for the respective zoom system with direct drive units is preset by the manufacturer and cannot be altered by a central system control facility. There is no possibility of subsequent change.

Also known is the combination of several magnifying components in common, such as, e.g.,

- a zoom magnification changing system (also called a microscopical zoom system in the literature) with an objective of fixed focal length,
- a zoom magnification changing system with an objective of variable focal length (also known as a zoom objective),
- a zoom magnification changing system with a multiple nosepiece for objectives of different, fixed focal lengths,
- a zoom magnification changing system with a zoom tube lens system, or
- a magnification changer providing discrete magnification steps and provided with a zoom objective and a zoom tube lens system.

SUMMARY OF THE INVENTION

While these combinations of magnifying components, given here as examples, expand the variable (continuously or by discrete steps) magnification range, the disadvantage is that the current optical function parameters of the individual components involved and their share in the total magnification, in particular, the individual magnification factors and their functional interdependence, are not taken into account with regard to achieving the best possible observation results.

In other words: the potentials given by the physical parameters of the individual components are less than fully utilized for the performance potential of the overall system with regard to, e.g., aperture, resolution, magnification, aberrations such as spherical aberration, or the depth of field achievable with the overall microscopical system.

Proceeding from this state, the problem of the invention was to create a microscope with an imaging system that is provided with several optical systems and/or system components and in which not only the functionality of the individual system components but also their interaction with regard to the achievable functional parameters of the overall microscopical system is improved compared to prior art.

According to the invention, the problem is solved by a microscope of the kind named at the beginning, equipped with a control unit for generating control signals for the at least one component, the optical effect of which on the imaging beam path can be varied by control action, in a first operating mode, for the closed-loop or open-loop control of the functional parameters only of the optical imaging system to which the component is assigned, and in a second operating mode, for the additional closed-loop or open-loop control of the functional parameters of the overall optical system of the microscope.

At least one memory unit should be provided, in which control signals, or control commands equivalent to control signals, for each of these components are stored and assigned to optical functional parameters. Furthermore, these components should be coupled with electronically controllable drive units, so that the input ports of the control unit are connected with the memory units and with a command input means, and their output ports are connected with the drive units. The command input means is designed for presetting optical functional parameters related to the observation or imaging of an object. By means of the stored control signals, the overall system can be controlled.

In an example embodiment, the microscope is provided with means for the measurement of current optical functional parameters, for comparing the current optical functional parameters with specified ones, and for the correction of control signals depending on deviations determined, and for the correction of the control signals stored. On this basis, control of the functional parameters of the overall system is possible.

The command input means may be configured for presetting several optical functional parameters, such as, especially, magnification, depth of field, resolution or aperture.

The magnification of a compound system in the sense of the present invention results from the parameters of the components. Here, $$\beta_{total} =_{def} |\beta| = |f'_{tube}/f'_{objective} * \Gamma_{magnification\ changer}|$$

If common definitions are chosen for such systems, there results a formally similar notation, in which, for clarity's sake, indexing is omitted in part:

for the objective:

$$\beta =_{DEF} \beta_{objective} =_{DEF} f'_{objective\ (\beta=1)}/f'_{objective}$$

for the afocal zoom system:

$$\beta =_{DEF} \beta_{zoom} =_{DEF} |\Gamma'_{zoom}| * f'_{tube\ (\beta=1)}/f'_{objective\ (\beta=1)}$$

for the tube lens system:

$$\beta =_{DEF} \beta_{tube} =_{DEF} f'_{tube}/f'_{tube\ (\beta=1)}$$

In the following, this notation is used for the magnification, but also, in an extended sense, for other system-descriptive parameters such as numerical aperture on the object side, resolution, object field size, etc.

The invented microscope is provided with a means for switching from the first to the second operating mode, and vice versa.

For example, the invented microscope comprises a zoom objective ZS1, a zoom tube lens system ZS3 and a zoom magnification changing system ZS2 arranged in between. Preferably, these components are designed in such a way that the zoom magnification changing system ZS2 covers a range of magnifications from $\beta=0.2$ to $4.0$, the zoom objective ZS1 a zoom range of magnifications $\beta=1.0$ to $2.0$, and the zoom tube lens system ZS3 a zoom range of magnifications $\beta=1.0$ to $2.5$. Because of the joint action of the components, a zoom range covering magnifications $\beta$ from 0.2 to 20 can be achieved.

In this connection, the control unit is designed to generate control signals for moving the lens components of the zoom systems ZS1, ZS2 and ZS3 to desired positions, which in the first operating mode are in connection with optical functional parameters of the respective individual zoom system, and in the second operating mode are in connection with optical functional parameters of the total imaging system, with storing of the desired positions for each of the movable lens components being intended in assignment to particular optical functional parameters.

The invention expressly also relates to microscopes comprising one or several optical zoom systems featuring lens components that can be moved along the optical axis, the movement of the lens components effecting a change of optical functional parameters of the microscopical imaging system, and one or several coded optical systems of fixed focal length, i.e. optical systems with lens components exclusively in stationary positions.

The term "coding" in this connection refers to data available in binary form, which are assigned, e.g., to an interchangeable objective to identify it and to render information about its individual basic characteristics such as focal length and relative aperture; the data may also contain information about vertex focal length aberrations or data for the correction of vignetting.

It is known that motorized optical zoom systems that are combined with uncoded or coded optical systems of fixed focal length, i.e. optical systems with fixed lens components, describe a complete microscopical imaging system, such as, e.g., the combination of a zoom magnification changing system with an objective of fixed focal length, i.e. exclusively fixed lens components, and a tube lens system of fixed focal length exclusively with fixed lens components, too.

Whereas motorized zoom systems with direct drive units can minimize optical aberrations thanks to their virtual control cams, the optical data in optical systems of fixed focal length are invariable due to the fixed lens components.

For the correction of the motorized zoom system, use is made only of the theoretical data of these so-called optically fixed systems; these data can be taken from a data sheet, for example. In coded systems, these are, e.g., the theoretical magnification, the theoretical vertex focal length and idealized residual optical aberrations. In prior art, a coded objective is identified by the microscopical system only with regard to its magnification.

During factory adjustment and testing of an optical system by means of objectively measuring adjusting devices, the real optical properties such as, e.g., magnification, vertex focal length, chromatic aberrations, distortion and field curvature of the fixed optical system, are registered and saved to an appropriate storage medium, say, in the form of a chip provided directly on the optical system. Thus, every fixed optical system has its individual characteristics, which can be read out, e.g., by an optoelectronic reading unit, and made available for further use.

It is known in this connection, though, that the optical parameters of the fixed optical systems show deviations from the theoretical data, according to the error tolerance allowed in manufacture.

By the analysis of the thus available real data of the fixed optical systems and, according to the invention, their linking to the virtual control cams of the zoom systems—corresponding to the second operating mode —, a marked optimization of the overall optical system is achieved, in that all optical real data of the overall system are included in system optimization and are taken into account, e.g., in the correction of the virtual control cam of a zoom magnification changing system, so that this correction affects not only the functional parameters of this zoom system, but the functional parameters of the overall microscopical system.

As a prerequisite for exact lateral measurements of objects, one needs, for example, to exactly register the magnification. With the invented arrangement, this is possible without the complicated and frequently faulty calibration of the optical system. Exact focusing of the overall system can thus be achieved in a simple way.

Furthermore, if the optical design provides for appropriate focus sensitivity of the lens components, the function of a highly advantageous internal focusing system can be achieved, in which, doing without object-side focusing (which may require, e.g., a disadvantageous movement of the specimen), so-called Z stacks of images or the like can be recorded.

Due to the system optimization enabled by the invention, a marked minimization of a wide variety of residual optical aberrations of the overall system is achieved. The measure and scope of the system optimization is determined by the application, i.e., it is sensible to carry out only those corrections which actually lead to better contrasting and image processing results and, thus, to more positive image diagnoses.

Continuous computation of optimized control cams for system improvement is effected, e.g., by preset basic routines using fast processors installed in the instrument. More complex corrections, e.g. for achieving special, application-related properties such as minimization of longitudinal chromatic aberration depending on the emission wavelength in multiple fluorescence excitations, are efficiently achieved with appropriate tools in the image processing software. Here, parts of the otherwise theoretical optical designing process are transferred to the microscope system itself in order to achieve a targeted improvement of the optical properties, i.e. the total potential of the overall system for improving the image is utilized.

For the application-related optimization of the overall optical system, two fundamentally different procedures are used:

System optimization in quasi-real time, i.e. after the individual coded optical components have been assembled with a motorized zoom system into the overall microscopical system, every zooming causes a recomputation of the currently optimum lens positions, provided the suitable, application-related optimizing algorithm has been activated. Otherwise, use is made of the stored theoretical data.

System optimization as a one-time setup, i.e. once the individual coded optical components have been assembled with a motorized zoom system into the overall microscopical system, the individual optical components per setup are optimally tuned to each other, and the optimized lens positions of the zoom system are then saved as new virtual cams. Whenever the objective is changed, the appropriate cams, registered and saved once and for all per setup, are called and used as the basis for zoom control. The same applies to the change of coded optical components, e.g., if the user equips the zoom microscope with new coded objectives.

A disadvantage of the latter procedure for system optimization compared to real-time system optimization is that it only permits a mean system optimization, i.e. a minimization of all residual optical aberrations throughout the zoom range. By contrast, real-time system optimization permits a targeted optimization of individual optical parameters. This may make it necessary to accept that other parameters that are less important for the specific application get impaired. With a reset facility, the user can always reactivate the original factory settings based on the theoretical values of the linked individual optical systems.

The general prerequisite for this is the presence of variable lens components of a zoom system or of other kinds of dynamical optical control elements that are part of an otherwise static optical system and, with this, are part of an overall optical system. The following combinations of fixed coded optical systems and optical zoom systems are feasible, for example:

Coded fixed objective+motorized zoom magnification changing system+motorized zoom tube lens system,
Coded fixed objective+motorized zoom magnification changing system+coded fixed tube lens system,
Coded fixed objective+motorized zoom tube lens system,
Motorized zoom objective+motorized zoom magnification changing system+coded fixed tube lens system,
Motorized zoom objective+coded fixed tube lens system.

The invented microscope can be configured with a single-channel imaging system in the sense of compound zoom microscopes and macroscopes, or with a two-channel imaging system, especially as a stereomicroscope.

The scope of the invention also comprises microscopes having the features according to claim 1, in which zoom systems controlled by virtual cams are used in the imaging beam path in combination with zoom systems featuring mechanical control cams instead of the virtual ones, as well as microscopes retrofitted with the invented features.

BRIEF DESCRIPTION OF THE DRAWINGS

Below, the invention is described in greater detail by exemplary embodiments. In the accompanying drawings.

DETAILED DESCRIPTION

Figure 1:
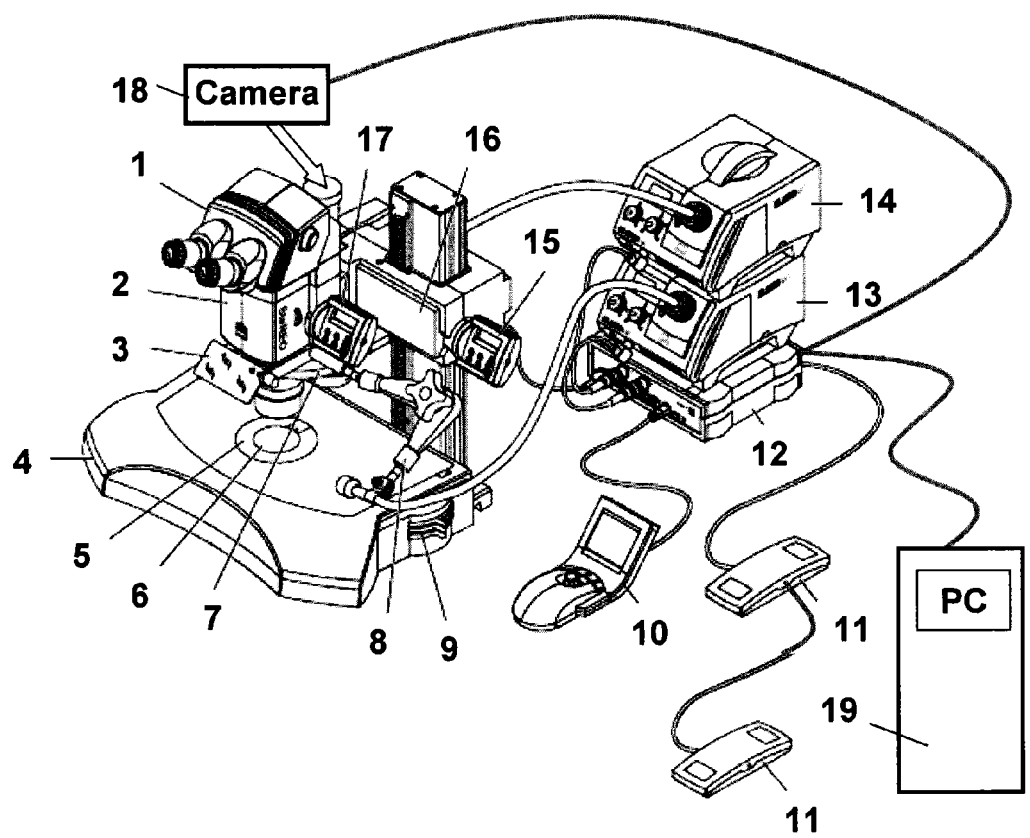
FIG. 1 shows the principle of a motorized, modular-design stereomicroscope system with control means as known in prior art.

As stated above, FIG. 1 shows an example of a motorized, modular-design stereomicroscope system as known in prior art, i.e. with optical components mechanically coupled and electronically connected via interfaces.

In terms of the present invention this corresponds to a first operating mode, in which control commands for the movement of lens components to desired positions are generated, which are related to optical functional parameters of the respective individual zoom systems. This is effected via the central control unit 12 shown in FIG. 1.

This microscope system has the abovementioned shortcoming that the potentials inherently given by the physical parameters of the individual components with regard to the performance capabilities of the overall system are not exhausted.

To remedy this shortcoming, the invention provides for a targeted control of the overall microscopical system according to optical functional parameters, and, as a prerequisite therefore, the making available of system data for improved linking of the components. According to the invention, this is effected by means of a control unit designed for switching system control from a first operating mode (described above) to a second operating mode in which control signals, or control commands equivalent to control signals, for moving the lens components to desired positions are generated, which are related to the optical functional parameters of the overall microscopical system.

It is within the scope of the invention if the control unit is designed only for the computation and generation of control commands for the second operating mode so that the microscope can only be operated in a mode that corresponds to the second mode described here. It is advantageous, however, if the control unit is designed so that it can generate control commands for both the first and the second operating mode. Switching the control unit to the mode required for a given application is effected, e.g., by means of a central, manually actuated input element, optionally by means of a pedal switch and/or a PC with appropriate software.

Figure 2:
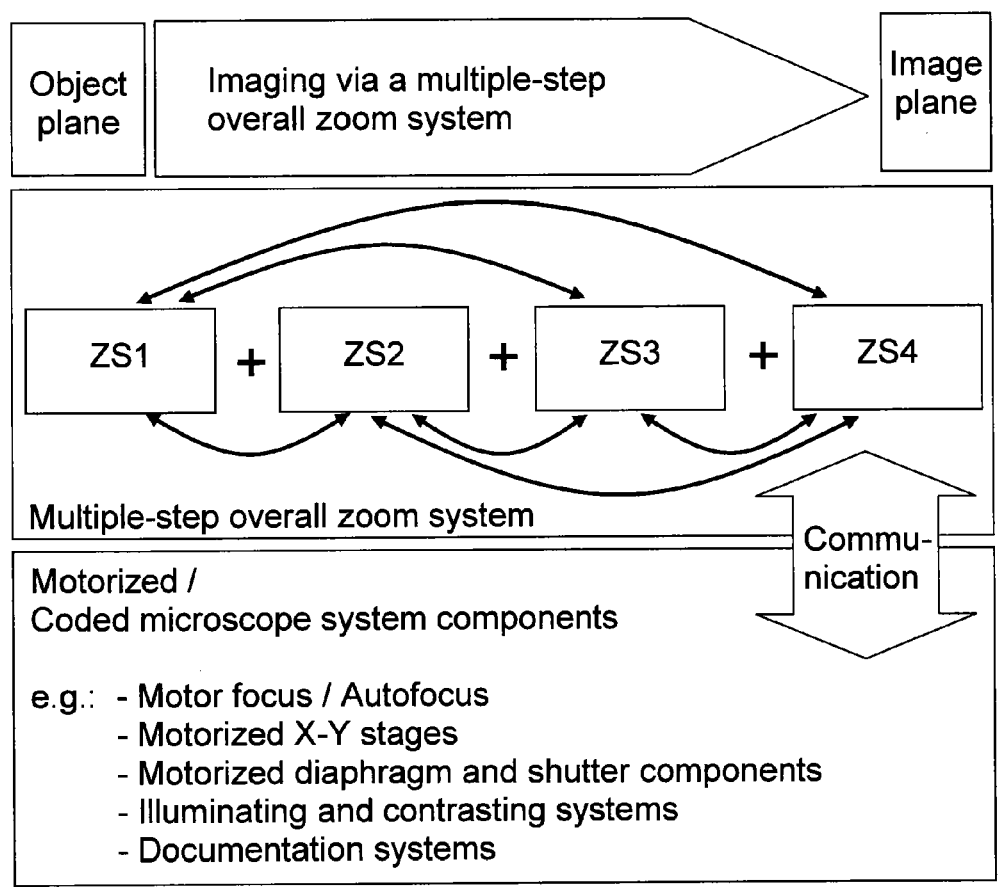
FIG. 2 is a schematic diagram of a linking of individual motorized zoom systems into a multiple-stage overall microscopical system.

Such a linking of individual motorized zoom systems in a multiple-stage overall microscopical system is shown schematically in FIG. 2.

The invented overall microscopical system, the functionality of which—other than in prior art—is brought about by, among other things, the innovative linking of individual motor zoom systems ZS1, ZS2, ZS3, ZS4, . . . , ZSn, permits multiple-stage imaging in the image plane, of an object positioned in the object plane, in communication with other motorized or coded system components of the microscope.

For implementing the desired functionality, it is provided that the individual system components are linked to each other in such way that each can communicate with each. Such communication may be effected, e.g., via USB or CAN ports.

Communication may have a hierarchical structure, with selected zoom systems being assigned a master function and others a slave function.

As an alternative, a non-hierarchical, decentralized structure, with each component involved being provided with intelligence in the form of integrated software for linking with other components, is also within the scope of the invention.

The linking of the individual zoom systems according to the invention is tied to prerequisites that are satisfied as follows:

1. Each movable lens component of the zoom systems is coupled to an electronically controllable drive unit; the desired positions for each movable lens component are stored in a memory as virtual cams (track curves) assigned to particular optical functional parameters and can be read from the said memory; the basis of the virtual track curves are tables of values for β=β(1ᵢ), which are assigned to the individual zoom systems for the magnifications $\beta_i$ as functions of the lens component positions $1_i$.

2. During zooming, the current parameters aperture $A_i=A_i[\beta_i(1_i)]$, resolution $b_i=b_i[\beta_i(1_i)]$, depth of field $T_i=T_i[\beta_i(1_i)]$, object field diameter $OFD_i=OFD_i[\beta_i(1_i)]$ and, in case of zoom objectives, the objective focal length $f_{obj\ i}=f_{obji}[\beta_{iobj}(1_{iobj})]$ are continuously calculated from the stored table of values $\beta_i=\beta_i(1_i)$ by means of an internal calculating program. The results of calculation characterize the functional parameters of the overall microscopical system.

3. Access to the memory contents is made from a central place—e.g., the control unit—in case of hierarchically structured communication, or from each individual component in case of non-hierarchically structured communication, and the said memory contents are combined with each other.

Figure 3:
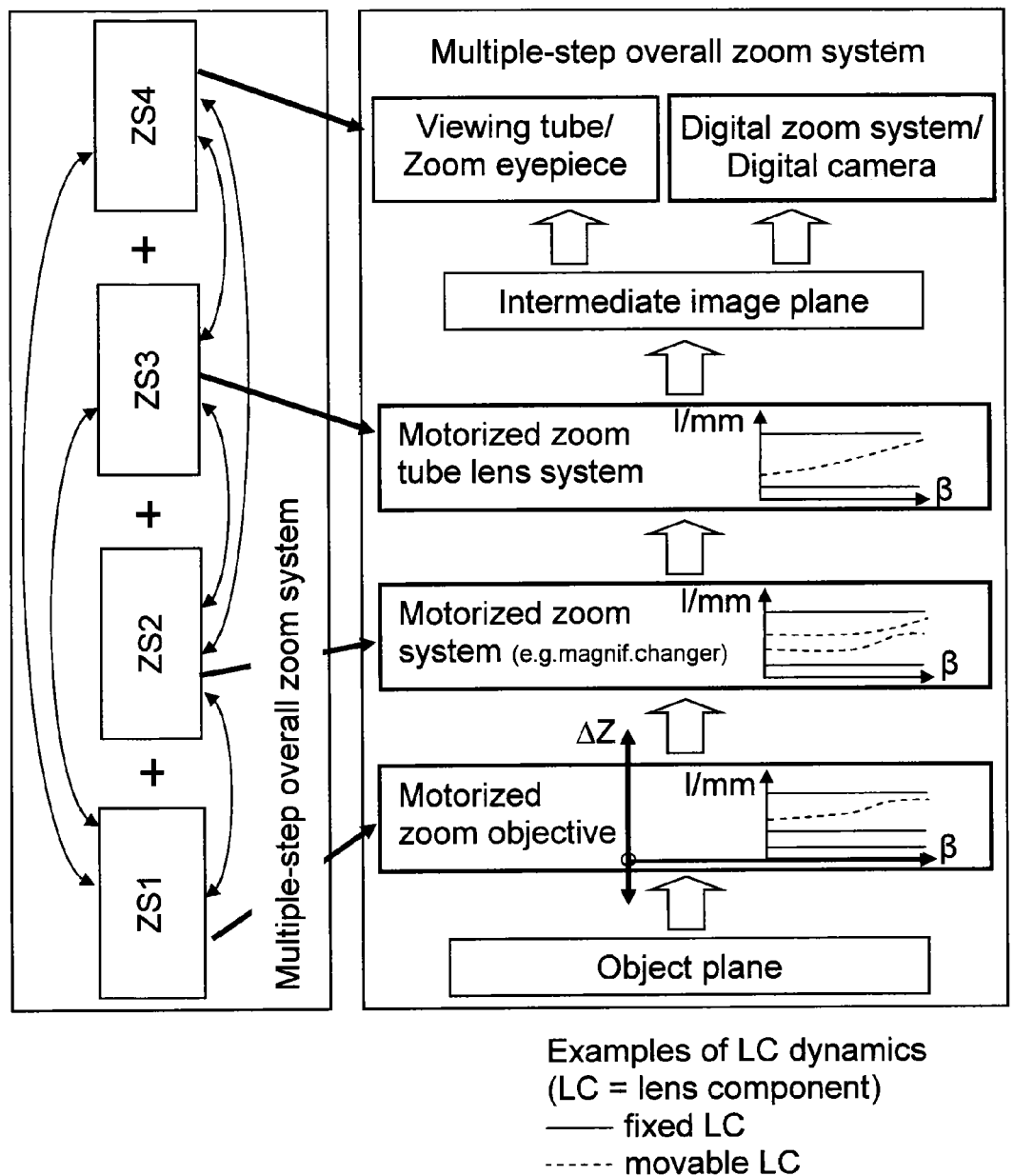
FIG. 3 shows a first exemplary embodiment of the invented overall microscopical system, exclusively with zoom systems.

FIG. 3 illustrates the application of the structural principle of FIG. 2 to a first example embodiment of such an overall microscopical system according to the invention.

This schematic illustration shows the individual motorized zoom components linked in the overall system, which represent a typical microscopical imaging chain between object and image plane, such as zoom objective ZS1, zoom magnification changing system ZS2, zoom tube lens system ZS3 and digital zoom system ZS4.

In addition, the illustration shows the dynamics of the variable lens components by broken lines in exemplary graphs correlated to each of the zoom systems. Plotted on the ordinate axis of each graph is the distance of the lens components (in mm), and plotted on the abscissa axis is the magnification β.

The zoom objective ZS1 consists, for example, of two fixed and two movable lens components. Optionally, the zoom objective ZS1 including the fixed lens components may, as known in prior art, be moved by a defined distance ΔZ along the optical axis for the purpose of so-called optical focusing. This objective focusing travel is limited by vignetting in the infinity segment between the objective and the zoom magnification changing system ZS2, the non-vignetted travel range being, on average, 2 mm≤ΔZ≤10 mm.

Within the imaging chain of the overall system, the zoom objective ZS1 has the function of image acquisition and primary magnification with a zoom factor typically in the range of 2× to 3×, with an added gain in resolution.

Also known are zoom objectives ZS1 that have, with a variable focal length, a constant transfer length, the distance between the object plane and the image plane. This type is particularly suitable for such applications in which, with variable magnification $\beta_{iobj}$, the distance to the object must remain constant.

Another objective design, in which the magnification remains constant or changes but slightly while the transfer length is variable, is particularly suitable for applications in process control, where a stationary zoom system is used to image objects at varied object distances. The advantage is that the variation of object distances achieved is greater than with the abovementioned optical focusing by moving the objective.

The zoom magnification changing system ZS2 also shown in FIG. 3 consists, for example, of two fixed and two movable lens components. Within the imaging chain of the multiple-stage overall system, the zoom magnification changing system ZS2 is the component having the greatest zoom factor, ranging, e.g., from 10× to 20×, with an added gain in resolution.

The motorized zoom tube lens system ZS3 consists, for example, of one fixed and two variable lens components. Within the imaging chain of the multiple-stage overall system, the zoom tube lens system ZS3 is the component for secondary magnification of the image with a zoom factor in the range of 2× to 3×, without resolution gain.

For certain applications, though, such as measurement and counting, secondary magnification by the zoom tube lens system is useful even if this is what is known as "empty magnification", i.e. without any gain in resolution.

The example of a digital zoom system ZS4 also shown is intended for digital documentation of the images transferred. Unlike the zoom components described before, this component does not use optical means for zooming but effects zooming by digital image processing of the images recorded by an imaging chip and resolved into pixels, a process by which no resolution gain is possible.

The typical digital secondary magnification range is $3\times \leq \beta_{iZS4} \leq 10\times$. For certain applications, this empty magnification is of interest nevertheless, especially where the detection of the form and position of objects, or measurement and counting jobs are concerned. In the simplest case, the digital zoom system ZS4 is a digital camera attached to the camera port of the microscope system.

The scope of the invention expressly comprises also the use of a zoom eyepiece instead of the digital zoom system ZS4 described here as an example, or also the use of a zoom eyepiece in addition to the digital zoom system ZS4. In principle, the zoom eyepiece is optically equivalent to the digital zoom system ZS4. The only difference is that a digital zoom system, as mentioned before, is positioned in the documentation path of a microscope system, whereas the zoom eyepiece is arranged in the visual path, thus serving for visual observation of the object image. It is only for the sake of clarity that the description of the invention is restricted to the presence of the digital zoom system ZS4.

From the linking of the individual zoom systems in a multiple-stage overall system, there results the current total magnification at the visual output port of the microscope without eyepiece magnification, or optionally at the camera port with digital zoom system ZS4 or zoom eyepiece:

$$\beta_{itotal}=\beta_{iobj}*\beta_{iMZS}*\beta_{iZTS}*\beta_{iZS4}$$

Figure 4:
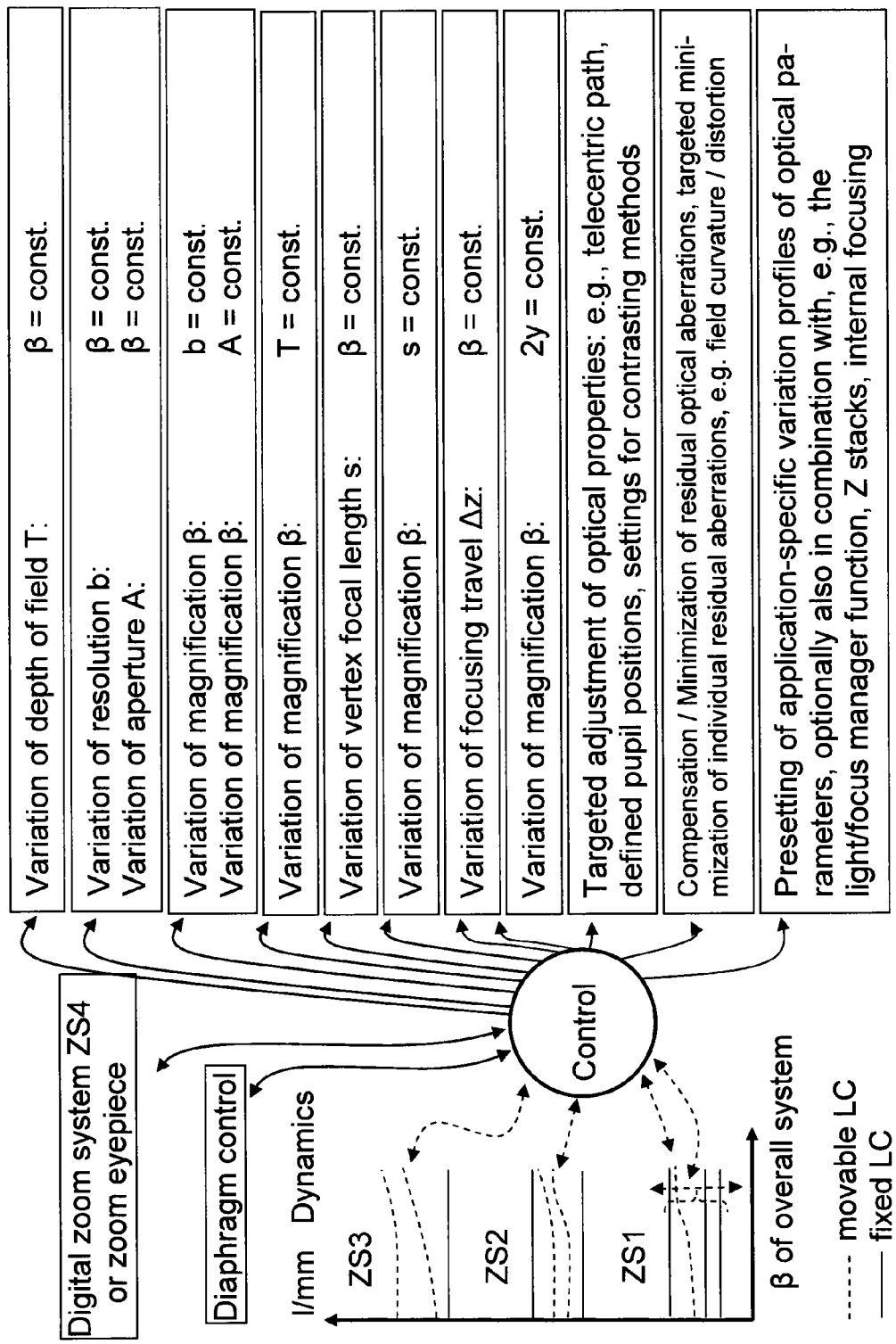
FIG. 4 illustrates the derivation of controllable optical functional parameters of the exemplary embodiment shown in FIG. 3.

FIG. 4 illustrates how the controllable optical functional parameters of the multiple-stage overall system are derived from the functional relationships described above. In addition to the magnification $\beta_i$ controllable in the individual zoom systems ZS1, ZS2, ZS3 and ZS4 according to optical functional parameters such as aperture, resolution, depth of field, etc., making the control cams of the variable lens components in the individual zoom systems ZS1, ZS2, ZS3 and ZS4 available to an overall optical system in which the control cams are linked and varied according to particular functionalities, brings about a substantial extension of the controllable system parameters.

Controlling the lens components now linked in an overall optical system and, in addition, motorized aperture diaphragm control and, optionally (therefore not shown in FIG. 4), the digital zoom system ZS4 or zoom eyepiece, is effected by the control unit represented schematically by a circle.

In the first operating mode, the said control unit only performs the separate controlling of the individual lens components with their assigned control cams, whereas in the second operating mode, it performs controlling of the individual lens components with varied control cams, e.g., for internal focusing or for the compensation or minimization of residual optical aberrations.

In other words: Whereas the use of the virtual control cams in the first operating mode is restricted to influencing the functional parameters of the optical system which they are assigned or belonging to, their use in the second operating mode is open, or enabled, with the aim of influencing the functional parameters of the overall microscopical system.

The logical connection of elements to be controlled, such as lens components, diaphragm control, digital zoom system, zoom eyepiece, objective focusing, and the optical functional parameters controllable according to profiles to be preset are symbolized in FIG. 4 by connecting arrows.

Thus, the linking of motor-driven lens components makes it possible, by computational combination of their virtual control cams and the diaphragm control data in the multiple-stage overall system, for the optical parameters to be controlled in a targeted manner within defined limits.

Technically, this functionality is achieved by storing diverse profiles, such as, e.g., magnification $\beta_i=\beta_i(1_i)$, aperture $A_i=A_i[\beta_i(1_i)]$, resolution $b_i=b_i[\beta_i(1_i)]$ or depth of field $T_i=T_i[\beta_i(1_i)]$ or with altered lens component control cams with $\beta^*_i=\beta^*_i(1^*_i)$ in a suitable memory circuit device, e.g., an EPROM of sufficiently large storage capacity, either in the control circuitry of the respective individual zoom component (ZS1 through ZS4) or in the central control unit.

By downloading via the respective interfaces of the zoom components ZS1 through ZS4 or of the central control unit, these various profiles can very conveniently be updated, or supplemented by further, application-specific profiles. This is a substantial advantage of the invention over the given, fixed mechanical control cams known in prior art.

The right part of FIG. 4 lists examples of various controllable optical functional parameters. Below, the invented mode of operation is explained for three cases of application:

In a first case of application, where a constant magnification $\beta_{total}$=const. is assumed, resolution and depth of field, e.g., can be varied within defined limits, which are defined by the zoom or aperture range of the linked individual zoom systems. In specific terms, zooming of the zoom magnification changing system ZS2 keeps the change of the magnification resulting from the variation of resolution and depth of field constant by reverse control of the downstream motorized zoom tube lens system ZS3 and/or the digital zoom system ZS4, or of a zoom eyepiece having a total magnification of $\beta_{total}$. Thus, a specimen can be observed with a constant final magnification but varying resolution and depth of field.

Where the object is to be observed at varying magnifications (zooming through) but with constant depth of field ($T_{total}$=const.) or resolution ($b_{total}$=const.), this is, in a second case of application, implemented by compensating effects via the magnifications of the zoom objective ZS1 and the zoom magnification changing system ZS2.

Where, in a third case of application, the object distance is to be varied while the final magnification is to be kept constant ($\beta_{total}$=const.), the variation of the magnification $\beta_{obj}$ effected by changing the vertex focal length of the zoom objective ZS1 can be compensated by reverse control of the zoom magnification changing system ZS2 with $\beta_{MZS}$ and/or the motorized zoom tube lens system ZS3 with $\beta_{ZTS}$.

Figure 5:
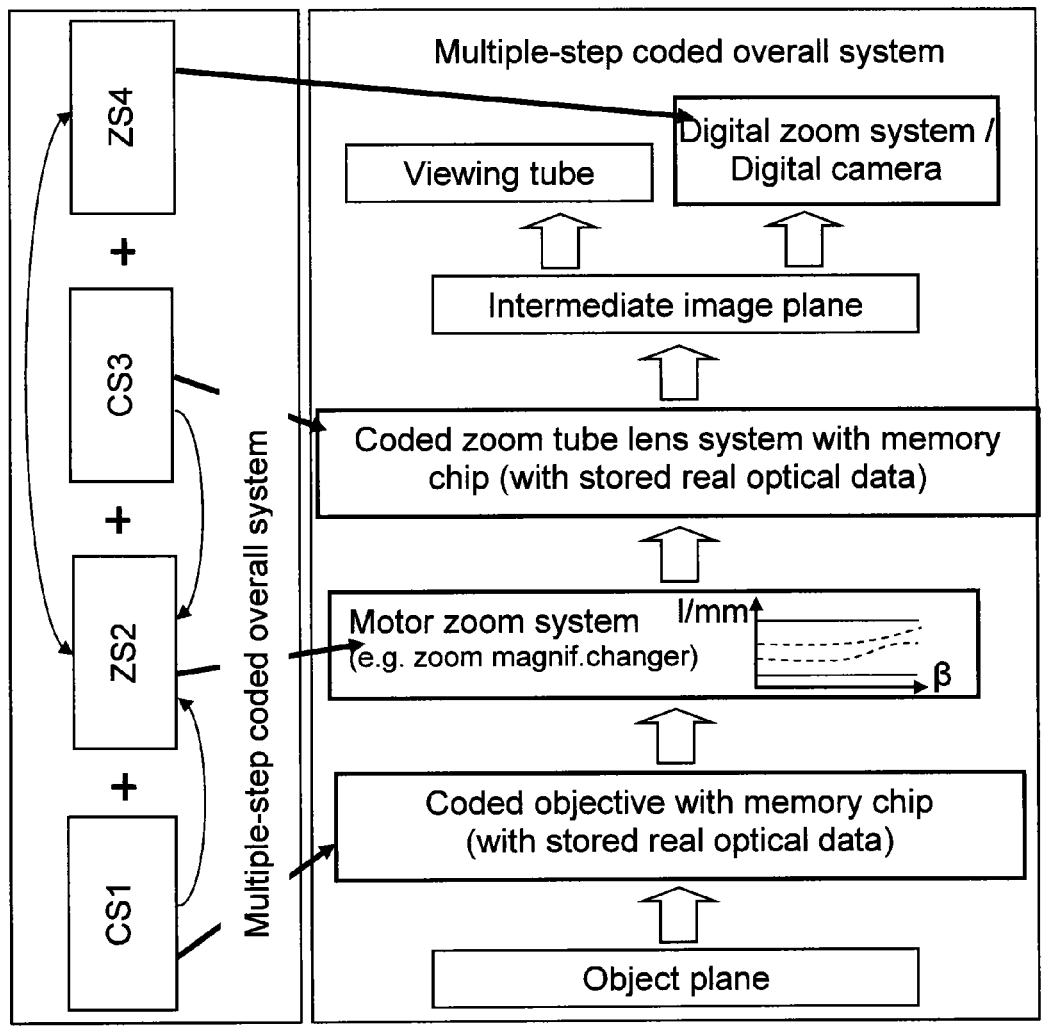
FIG. 5 shows a second exemplary embodiment of the invented overall microscopical system, in which, in addition to zoom systems, optical imaging systems of fixed focal length are provided.

FIG. 5 shows the fundamental structure of a second exemplary embodiment of the invented overall microscopical system. Combined here within the overall system are the zoom magnification changing system ZS2 and the digital zoom system ZS4 with a coded objective CS1 of fixed focal length and a coded tube lens system CS3 of fixed focal length.

Overall microscopical systems of this kind frequently feature means for the change of objectives and can be equipped with objectives of different magnifying power and different spectral characteristics. Thus, for example, the transfer length may vary between the objectives and wavelengths.

Means for measuring focal lengths are known, which can also be used in connection with the present invention.

Moreover, objectives are supplied with manufacturers' certificates, which, among other items, contain information about color variations. Registration and algorithmic evaluation of these parameters are within the scope of the invention.

Figure 6:
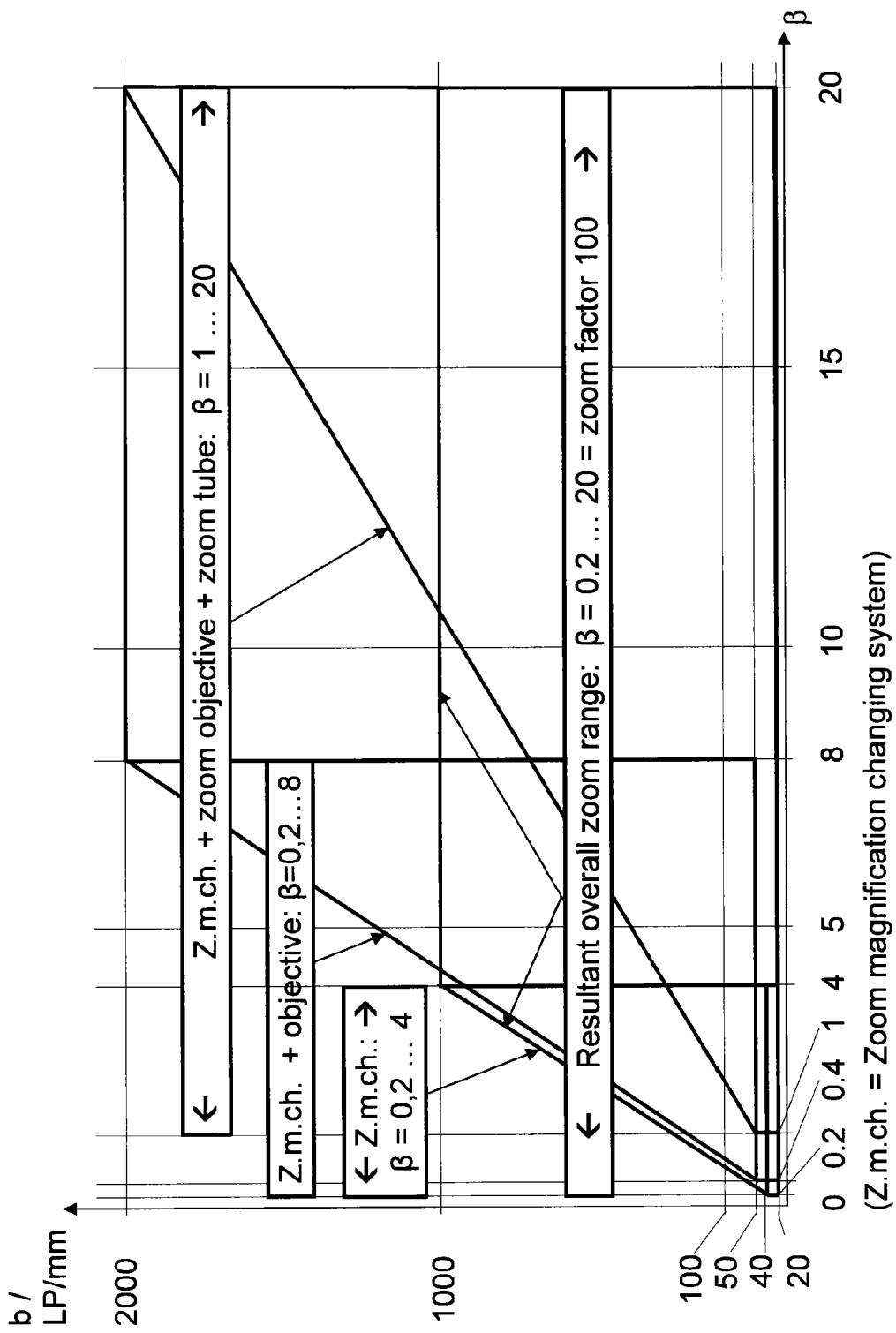
FIG. 6 shows examples of individual and total resolution ranges as a function of individual magnifications and of a total magnification for various control functions.

FIG. 6 shows the individual and total resolution ranges as functions of individual magnifications and of a total magnification as examples of different control functions for $\beta=\beta(b)$ or, because of b~A, for $\beta=\beta(A)$.

The resolution b in terms of LP/mm (line pairs per mm) has been calculated from the resolved distance 2y in terms of μm. Here, the three-stage overall system shown as an example is composed of the zoom objective ZS1, the zoom magnification changing system ZS2 and the zoom tube lens system ZS3; these three zoom systems and their linked combinations have the following parameters:

| Component | Zoom range | Zoom factor | Resolution range b in LP/mm |
|---|---|---|---|
| Zoom objective ZS1 | $\beta = 1.0 \ldots 2.0$ | 2x | — |
| Zoom magnification changing system ZS2 | $\beta = 0.2 \ldots 4.0$ | 20x | — |
| Zoom tube lens system ZS3 | $\beta = 1.0 \ldots 2.5$ | 2.5x | — |
| Zoom objective ZS1 + zoom magnification changing system ZS2 | $\beta = 0.2 \ldots 8.0$ | 40x | $\beta_{obj} = 1.0:20 \ldots 1000$ $\beta_{obj} = 2.0:40 \ldots 2000$ |
| Zoom objective ZS1 + zoom magnification changing system ZS2 + zoom tube lens system ZS3 | $\beta = 0.2 \ldots 20.0$ | 100x | $\beta_{obj} = 1.0:20 \ldots 1000$ $\beta_{obj} = 2.0:40 \ldots 2000$ |

Based on the zoom magnification changing system ZS2, the linking of the zoom objective ZS1 with the zoom magnification changing system ZS2, and the linking of the zoom objective ZS1 with the zoom magnification changing system ZS2 and the zoom tube lens system ZS3, FIG. 6 shows both the possible limit resolutions, i.e. the maximum possible resolutions $b_{imax}=b_{imax}(\beta_{itotal})$, and, for the case that the magnifications of the three zoom systems ZS1, ZS2, ZS3 are distributed differently, the ranges of possible resolutions as functions of the total magnifications $b_i=b_i(\beta_{itotal})$.

The exemplary linking of the three zoom systems ZS1, ZS2 and ZS3 makes the very large range of variation of the parameters clearly visible. In the range of small magnifications $0.2 \leq \beta \leq 1.0$ and, thus, low resolutions, the object fields observable are large. In this range known as low-power or macro examination range, the user gains an overview of the object for orientation and selects the object areas of interest, before he changes to higher magnifications and higher resolutions to closely inspect or to document the object details of interest.

Thus, this functionality meets the typical working method of a microscope user. One can also see here the special advantage compared to conventional microscopy with discrete magnification steps, since zoom systems with large zoom factor, i.e., multiple-stage zoom systems, allow the object details to be closely tracked while the magnification is varied—in contrast to conventional microscopy, where objectives have to be changed several times and refocusing is required after every objective change.

Figure 7:
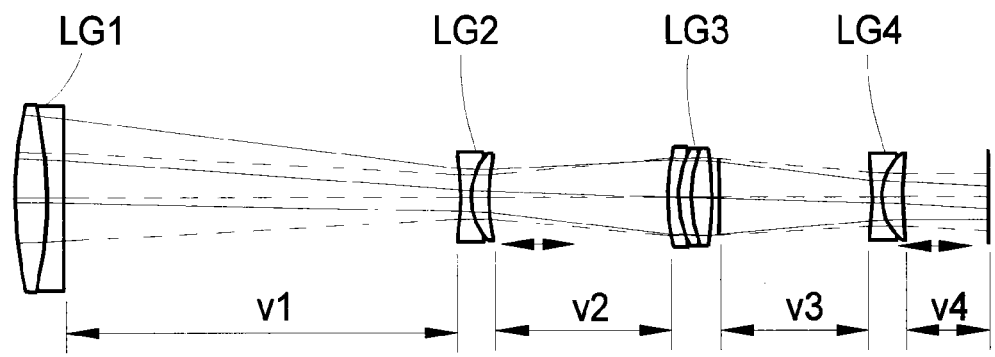
FIG. 7 illustrates the principle of an afocal zoom magnification changing system.
Figure 9:
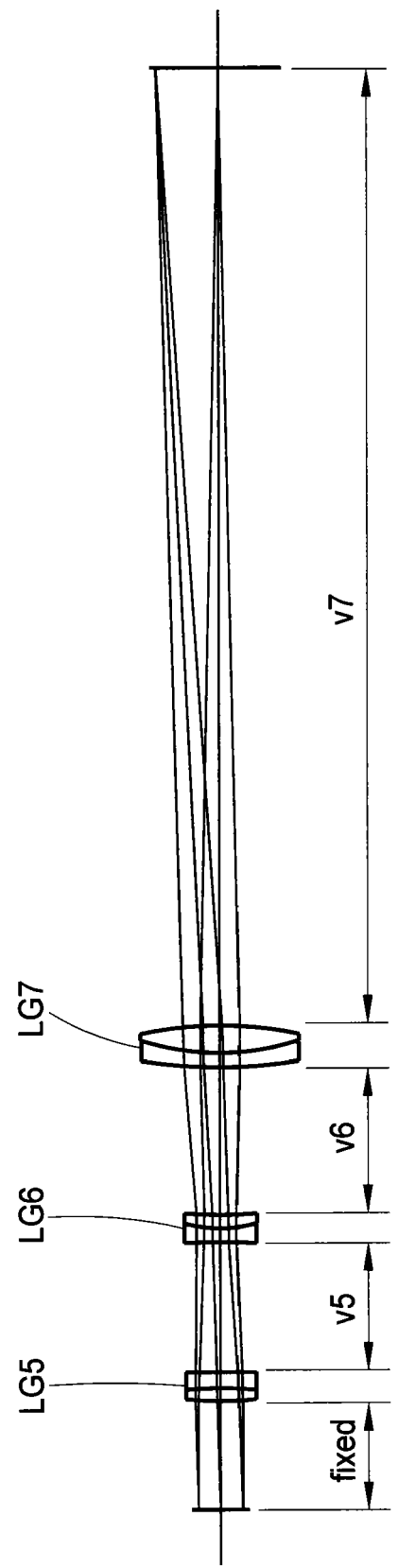
FIG. 9 illustrates the principle of the lens components of a specific zoom tube lens system.

A concrete embodiment of a multiple-stage zoom system is formed, e.g., by combination of an afocal zoom magnification changing system ZS2, the principle of which is shown in FIG. 7, with a zoom tube lens system ZS3 shown in FIG. 9.

The zoom magnification changing system ZS2 according to FIG. 7 comprises four lens components designated LG1 through LG4, beginning on the object side. The lens components LG2 and LG4 are movable relative to the other lens components in the direction of the optical axis of the zoom magnification changing system ZS2, and for this purpose they are coupled with electronically controllable drive units, preferably in the form of stepper motors.

Concerning refractive powers, the lens component LG1 is designed to have positive, the lens component LG2 negative, the lens component LG3 positive, and the lens component LG4 negative refractive power. This zoom magnification changing system ZS2 has an overall length of 130 mm and has, for example, other system data as follows:

| Plane, or lens component | Radius r | Thickness d | Variable distance | Refractive index $n_e$ | Abbe constant $v_e$ |
|---|---|---|---|---|---|
| Infinity space up to the objective | | | | | |
| | 55.8300 | | | | |
| LG1 | | 4.50 | | 1.530190 | 76.58 |
| | −55.8300 | | | | |
| | | 2.30 | | 1.584820 | 40.57 |
| | infinite | | | | |
| | | | v1 | | |
| | −35.2275 | | | | |
| LG2 | | 1.40 | | 1.747910 | 44.57 |
| | 9.1730 | | | | |
| | | 2.50 | | 1.812659 | 25.16 |
| | 25.1205 | | | | |
| | | | v2 | | |
| | 30.0675 | | | | |
| LG3 | | 1.50 | | 1.812659 | 25.16 |
| | 15.0700 | | | | |
| | | 1.80 | | 1.489140 | 70.23 |
| | 18.9690 | | | | |
| | | 2.90 | | 1.716160 | 53.61 |
| | −44.9896 | | | | |
| Diaphragm | | 1.00 | | | |
| | infinity | | | | |
| | | | v3 | | |
| | −47.6566 | | | | |
| LG4 | | 1.30 | | 1.620680 | 49.54 |
| | 7.9440 | | | | |
| | | 2.90 | | 1.624080 | 36.11 |
| | 41.8692 | | | | |
| | | | v4 | | |
| Infinity space up to the tube lens system (FIG. 9) | | | | | |

Figure 8:
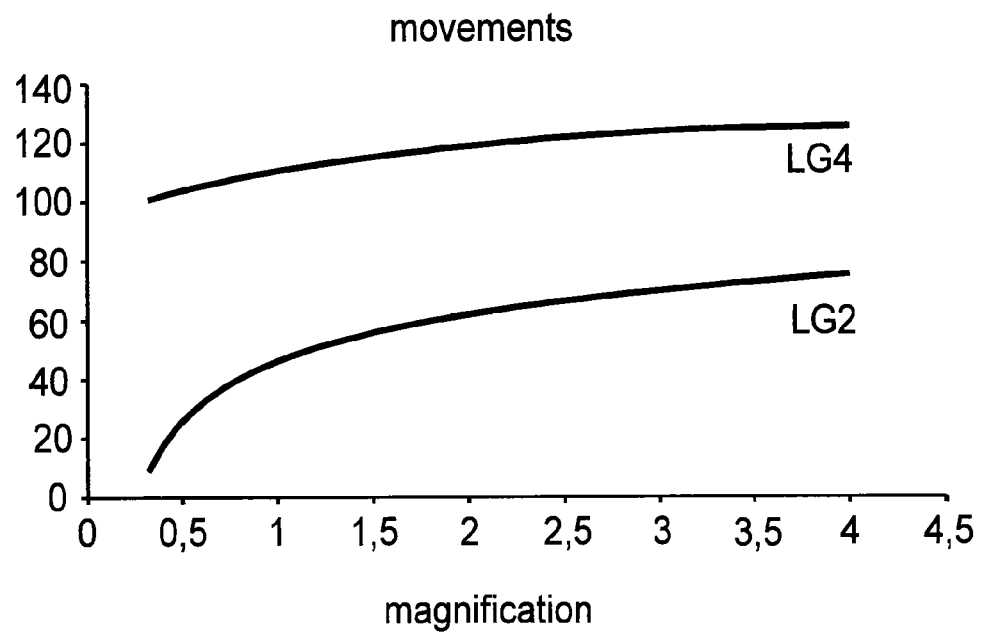
FIG. 8 illustrates the movement characteristics of the lens components of the zoom magnification changing system shown in FIG. 7.

The movement characteristic of the lens components LG1 through LG4 of the zoom magnification changing system ZS2 from FIG. 7 is shown in FIG. 8. It is evident therefrom that the initial value of the magnification is 0.32, and the final value is 4.0, so that the magnification range is 12.5×. At distance settings v1 through v4, selected magnifications of 4.0×, 1.0× and 0.32× result as follows:

| | Magnification | | |
|---|---|---|---|
| | 4.0× | 1.0× | 0.32× |
| v1 | 68.657 | 39.472 | 2.098 |
| v2 | 11.189 | 40.373 | 77.747 |
| v3 | 28.039 | 12.818 | 3.104 |
| v4 | 0.016 | 15.237 | 24.951 |

The zoom tube lens system ZS3 shown in FIG. 9, which is suitable for combination with zoom magnification changing system ZS2 described above, permits the focal length to be varied from 200 mm to 500 mm, and thus the tube lens system magnification to be varied by the factor 2.5×. The tube lens system magnification $\beta_{tube}$ is defined by $\beta_{tube} = f'_{tube}/f_{tube}$ ($\beta = 1$).

This zoom tube lens system ZS3 comprises three optical lens components designated LG5 through LG7, beginning on the object side. The lens components LG6 and LG7 are movable relative to the lens component LG5 in the direction of the optical axis, and for this purpose they are coupled with electronically controllable drive units, which preferably are designed as stepper motors.

The other system data of the zoom tube lens system ZS3 are given in the following table (lengths in terms of mm):

| Pupil, plane or lens component | Radius r | Thickness d | Distance | Refractive index $n_e$ | Abbe constant $v_e$ |
|---|---|---|---|---|---|
| Entrance pupil | | | fixed | | |
| | 54.93 | | | | |
| LG5 | | 2.400 | | 1.6099 | 56.00 |
| | −97.30 | | | | |
| | | 3.000 | | 1.8127 | 25.00 |
| | −2075.25 | | | | |
| | | | V5 | | |
| | −79.12 | | | | |
| LG6 | | 2.50 | | 1.7584 | 52.00 |
| | 23.54 | | | | |
| | | 2.50 | | 1.7918 | 26.00 |
| | 61.89 | | | | |
| | | | V6 | | |
| | 93.77 | | | | |
| LG7 | | 2.60 | | 1.7545 | 35.00 |
| | 48.59 | | | | |
| | | 4.90 | | 1.4985 | 81.00 |
| | −71.76 | | | | |
| | | | V7 | | |
| Image plane | | | | | |

Figure 10:
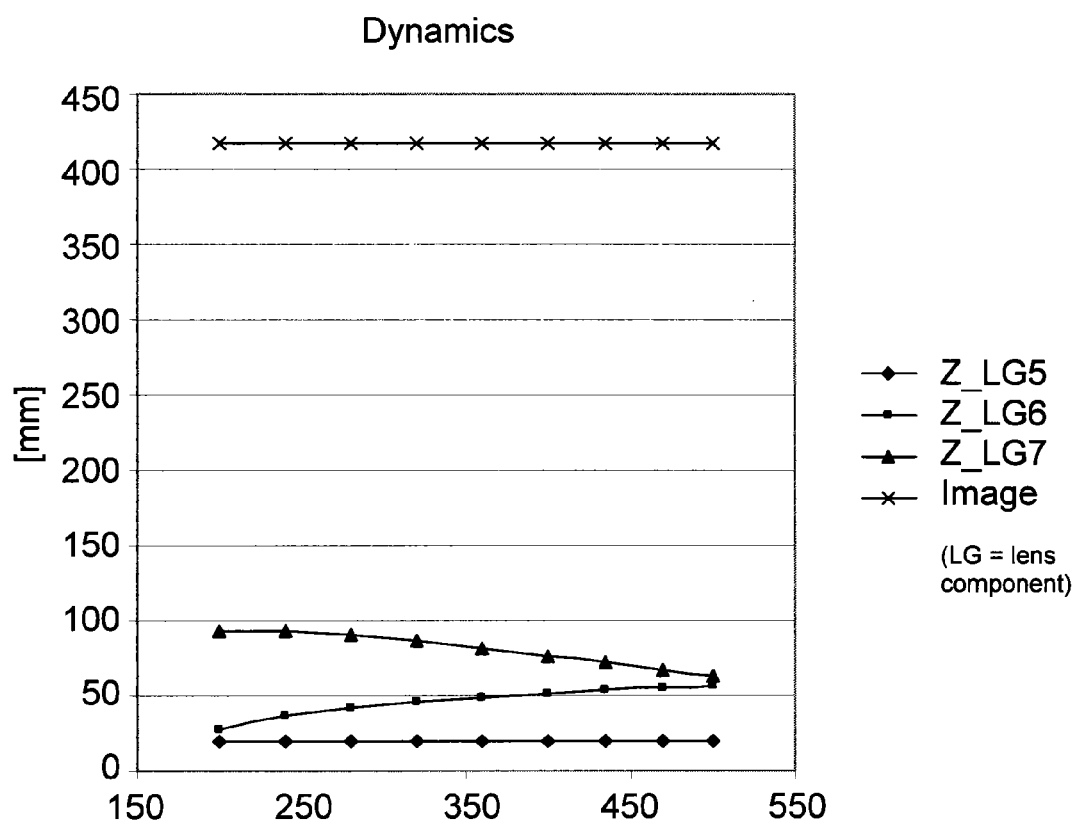
FIG. 10 illustrates the dynamics of the zoom tube lens system shown in FIG. 9.

The dynamics of the zoom tube lens system ZS3 according to FIG. 9 is shown in FIG. 10. At distance settings v5 through v7, selected focal lengths result as follows:

| f | 200 | 240 | 280 | 320 | 360 | 400 | 435 | 470 | 500 |
|---|---|---|---|---|---|---|---|---|---|
| V5 | 2.50 | 11.14 | 16.81 | 20.87 | 23.93 | 26.35 | 28.09 | 29.57 | 30.67 |
| V6 | 60.18 | 51.60 | 43.12 | 34.96 | 27.16 | 19.72 | 13.48 | 7.47 | 2.50 |
| V7 | 316.35 | 316.30 | 319.10 | 323.21 | 327.94 | 332.97 | 337.47 | 341.99 | 345.86 |

It can be seen that the distances listed in the above movement table densely fill the total range and describe two coupled movements, which are defined by the focal length f' parameter and thus are defined also via the tube lens system magnification $\beta_{tube}$. So it is possible to use, e.g., the magnification as a control parameter.

The size of the entrance pupil is a function of the magnification of the zoom magnification changing system ZS2 according to FIG. 7.

Arranged upstream of the zoom magnification changing system ZS2 according to FIG. 7 is an objective (not shown on the drawing), the object-side aperture of which results from $nA = \Phi_{EP-z.m.ch.}/2*f'_{objective}$. The object-side aperture is a multiplicative parameter. The objective magnification enters the formula with $\beta_{objective} = f'_{objective\,(\beta=1)}/f'_{objective}$. The change of the tube lens system's focal length has no effect on the object-side aperture, i.e., the tube lens system's focal length enters the formula with a constant 1.

Figure 11:
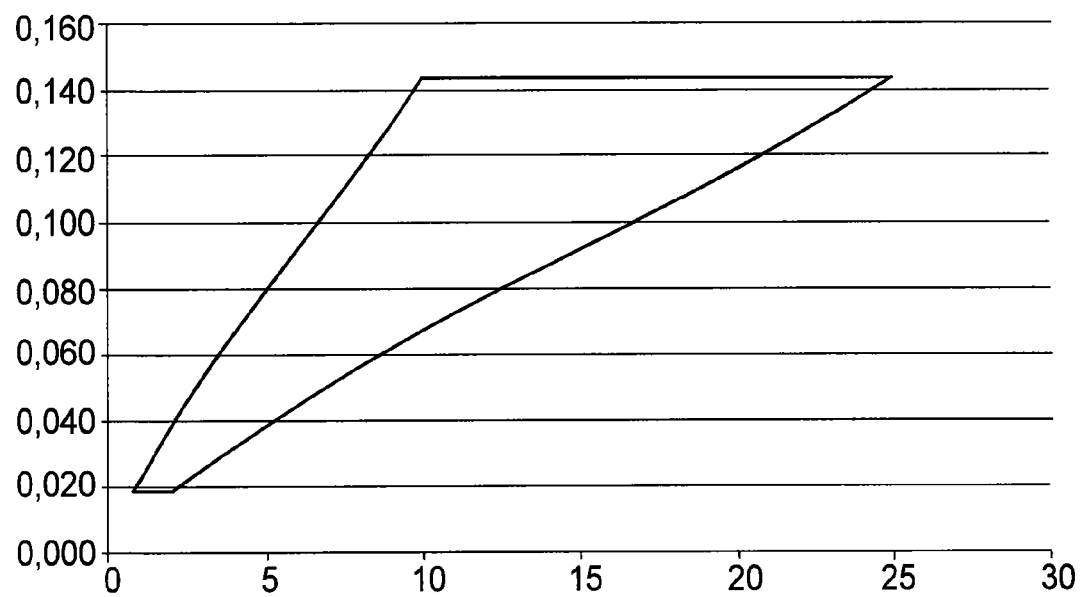
FIG. 11 is a graph explaining the possibilities of influencing the object-side numerical aperture.

The possible ways to influence the object-side numerical aperture, which result from the combination of the zoom magnification changing system ZS2 with the zoom tube lens system ZS3 having the respective data described above can be seen from the graph in FIG. 11.

Within the polygon shown in the said graph, any magnification and any object-side aperture can be set. To arrive at an end configuration starting from an initial configuration, one determines the necessary movements of the lens components LG1 through LG4 of the zoom magnification changing system ZS2, and of the lens components LG5 through LG7 of the zoom tube lens system ZS3.

For this purpose, one determines, in a first step, the movements required to vary the magnification of the zoom magnification changing system ZS2 going by the change of the object-side aperture, and the movements required to vary the tube lens system's magnification, from the change of the total magnification and the predetermined change of magnification of the zoom magnification changing system ZS2.

Once the necessary movements have been determined in this way, one moves, in a second step, the lens components LG1 through LG4 and, if necessary, the lens components LG5 through LG7 accordingly in order to bring the total microscopical zoom system to the desired final configuration with regard to magnification and object-side aperture.

Thus, an exemplary application is described of a linking of the components involved in the second operating mode of the invention with regard to the magnification and object-side aperture of the total microscopical zoom system.

An example application of linking the components involved in the second operating mode of the invention with regard to focus adjustment results in connection with microscope settings for the imaging of objects structured in depth, especially for the creation of stereoscopic images from observation planes at varied depths of an object.

Involving the zoom tube lens system ZS3 described above, one obtains a microscope system both with variable magnification and variable object-side aperture and with variable focusing. The zoom tube lens system ZS3 implements the variation of the focal length as the total transfer length is varied.

In this process, one determines, in a first step, the movements required for changing the focus position, as described, e.g., in DE 10 2005 040 830 A1, and then, in a second step, one brings the lens components of the components involved into the desired final configuration with regard to the focus position.

LIST OF REFERENCES 1 binocular viewing tube
2 motorized zoom system
3 antiglare shield
4 transmitted-light illuminator
5, 6 specimen receptacles
7 multiple nosepiece
8 focusing optics
9 operating unit
10 operating element
11 pedal switches
12 central control unit
13, 14 light sources
15 focus control unit
16 stand column
17 zoom control unit
18 camera
19 PC
CS1 coded objective
CS3 coded tube lens system
ZS1 zoom objective
ZS2 zoom magnification changing system
ZS3 zoom tube lens system
ZS4 digital zoom system
LG1 . . . LG7 lens components

What is claimed is:

1. A microscope comprising:
in succession in an imaging beam path, an objective, and at least one of a zoom system and a diaphragm, which form part of an overall optical system of the microscope and wherein the overall optical system includes at least one optical imaging system that has at least one subassembly whose optical effect on the imaging beam path can be varied by control;
a control unit that generates control signals for the at least one subassembly, in a first operating mode for closed-loop or open-loop control of only functional parameters of the optical imaging system which the at least one subassembly is assigned to, and in a second operating mode, for closed-loop or open-loop control of functional parameters of the overall optical system of the microscope,
at least one memory unit in which the control signals for each of the at least one subassemblies are stored so as to be assigned to optical functional parameters, and
electronically controllable drive units that are coupled to the at least one subassembly, wherein
input ports of the control unit are connected to the at least one memory unit and a command input device, and output ports of the control unit are connected to the electronically controllable drive units, and wherein
the command input device is designed for presetting of several optical functional parameters related to observation or imaging of an object, including at least one of magnification, depth of field, resolution and aperture, and
zoom systems, at least one of which is part of the at least one subassembly, each of the zoom systems having at least one movable lens component, the zoom systems being arranged in series on a common optical path
the zoom systems comprising a zoom objective, a zoom tube lens system, a zoom magnification changing system arranged between the zoom objective and the zoom tube lens system, and a digital zoom system, each of the zoom objective, the zoom tube lens system and the zoom magnification changing system having at least one lens component moveable along an optical axis for varying individual magnification,
each moveable lens component of the zoom systems being coupled to one of the electronically controllable drive units, desired positions for each moveable lens component being stored in a memory unit as virtual and individual control cams assigned to particular optical parameters, and the individual control cams being linked and varied in the second operating mode with respect to the first operating mode.

2. The microscope as claimed in claim 1, further comprising a device for switching from the first to the second operating mode, and vice versa.

3. The microscope as claimed in claim 1, further comprising:

structures for measurement of current optical functional parameters of individual optical systems or of the overall optical system, structures for comparison of the currently measured optical functional parameters with preset ones, structures for correction of the control signals depending on deviations determined by the comparison, and structures for the correction of the control signals stored in the memory unit.

4. The microscope as claimed in claim 1, wherein the zoom magnification changing system covers a range of magnifications from $\beta=0.2$ to $4.0$, the zoom objective covers a zoom range of magnifications from $\beta=1.0$ to $2.0$, and the zoom tube lens system covers a zoom range of magnifications from $\beta=1.0$ to $2.5$.

5. The microscope as claimed in claim 4, in which, by joint action of the zoom magnification changing system, the zoom objective and the zoom tube lens system a zoom range of magnifications $\beta$ from 0.2 to 20 is covered.

6. The microscope as claimed in claim 1, further comprising:

a zoom eyepiece.

7. The microscope as claimed in claim 1, further comprising at least one diaphragm of adjustable aperture.

8. The microscope as claimed in claim 1, wherein the at least one subassembly whose optical effect on the imaging beam path can be varied by control is selected from a group consisting of a lens group or diaphragm that is movable in a direction of an optical axis, a diaphragm of variable aperture, a digital zoom device, a shutter or a focusing device.

9. The microscope as claimed in claim 1, further comprising a single-channel imaging system.

10. The microscope as claimed in claim 9, wherein the microscope is implemented as a compound zoom microscope or macroscope.

11. The microscope as claimed in claim 10, wherein the microscope is implemented as a stereomicroscope.

12. The microscope as claimed in claim 1, further comprising a two-channel imaging system.

* * * * *